Jan. 7, 1941.	W. HICKMAN ET AL	2,227,780
INDIVIDUAL MILK BOTTLE CARRIER
Filed Feb. 29, 1940    2 Sheets-Sheet 1
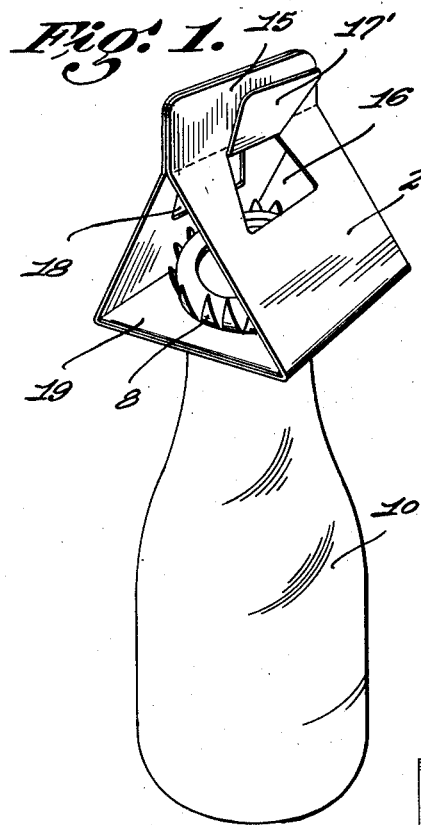
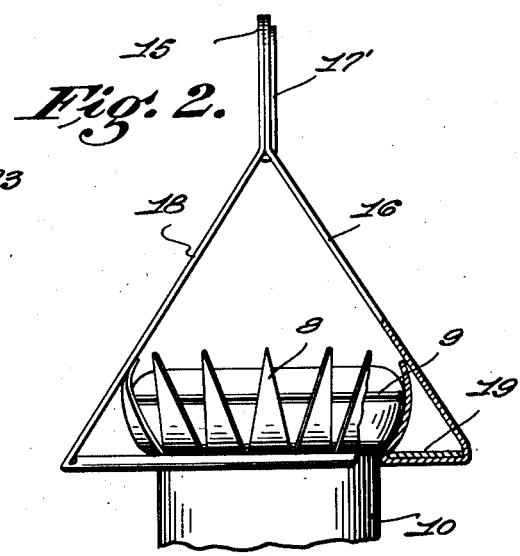
Inventors
Wenona Hickman
Laura Cossey
By
Lacy & Lacy, Attorneys Inventors
Wenona Hickman
Laura Cossey Patented Jan. 7, 1941

2,227,780

UNITED STATES PATENT OFFICE 2,227,780

INDIVIDUAL MILK BOTTLE CARRIER

Wenona Hickman and Laura Cossey, Danville, Ill.

Application February 29, 1940, Serial No. 321,565

7 Claims. (Cl. 215—100)

This invention relates to bottle carriers and more particularly to a device for carrying individual bottles of milk.

The object of the invention is to provide a comparatively simple and inexpensive device of the character described, the construction of which is such that, when placed in position on the neck of a milk bottle, the bottle of milk may be conveniently carried from place to place without danger of breaking the bottle or spilling the contents thereof.

A further object of the invention is to provide an individual milk bottle carrier comprising a carrying member having its intermediate portion formed with a circular series of inwardly extending slits defining tongues normally disposed in a horizontal plane and adapted to be deflected upwardly by engagement with the neck of a milk bottle, means being provided for exerting a clamping or wedging action on said tongues to cause them to securely grip the bottle neck.

A further object is to provide a milk bottle carrier formed from a single cardboard blank having side and end flaps so constructed that, when the blank is folded into proper shape, a milk bottle may be supported between the end flaps with said end flaps serving as carrying handles.

A still further object of the invention is generally to improve this class of devices so as to increase their utility, durability and efficiency as well as to reduce the cost of manufacture.

In the accompanying drawings forming a part of this specification and in which similar numerals of reference indicate corresponding parts in all the figures of the drawings:

Figure 1 is a perspective view of a bottle carrier constructed in accordance with the present invention showing the same in position on the neck of a milk bottle, Figure 2 is an enlarged side elevation, partly in section, Figure 3 is a plan view of the blank from which the carrier is formed.

Figure 4:
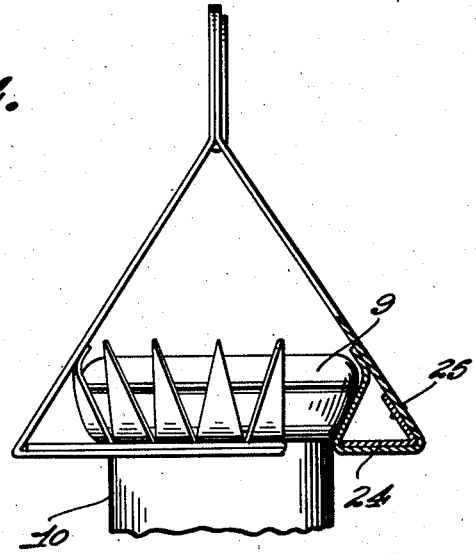
Figure 4 is a side elevation, partly in section, illustrating a modified form of the invention.

The improved bottle carrier forming the subject-matter of the present invention is prefarably constructed of relatively stiff cardboard or other suitable material possessing the desired strength and durability, the cardboard being cut to form a unitary blank 5 of the construction shown in Figure 3 of the drawings.

The blank 5 comprises a flat substantially rectangular central portion 6 having a circular series of radial slits 7 formed therein and defining intermediate tapered tongues 8 normally disposed in a horizontal plane. The diameter of the circle from which the tongues 8 radiate is equal to the diameter of the bead 9 on the neck of a milk bottle, indicated at 10, so as to permit the bead 9 to be pressed upwardly through the central section 6 of the blank.

The blank 5 is provided with transverse weakened portions or fold lines 11 defining end flaps or walls 12 and 13, and disposed in spaced relation to the ends of the flaps 12 and 13 are other fold lines or weakened portions 14 defining terminal lips 15. The end flap 12 is provided with a finger-receiving opening 16 and the end flap 13 is formed with a substantially rectangular incision 17 defining a similar finger-receiving opening 18, the material between the walls of the incision 17 being adapted to be pressed laterally to form a locking tab or tongue 17' which passes through the opening 16 to hold the end flaps in assembled position when the blank is folded, as best shown in Figure 1 of the drawings.

Extending laterally from the central section 6 and formed integral therewith are side flaps 19 having recesses 20 opening through the outer ends of the flaps, the inner walls of said recesses being curved at 21 to conform to the shape of the neck of a bottle. The blank 5 at the junction of the side flaps and central portion 6 is provided with fold lines 22 to permit said side flaps to be folded inwardly in overlapped relation over the central portion of the blank.

In folding the blank to form a carrier, the end flaps 12 and 13 are bent inwardly and upwardly on the fold lines 11 to form converging side walls 23 which constitute carrying handles. The tongues of the central portion 6 are then pressed downwardly over the neck of the bottle and the side flaps 19 folded inwardly and downwardly over the free ends of the tongues, after which the carrier is moved upwardly on the bottle neck which causes the lateral flaps 19 to exert a wedging or clamping action on the base of the tongues and cause said tongues to firmly grip the bead 9 and prevent accidental displacement of the milk bottle, as best shown in Figure 2 of the drawings. The tongue 17' is then passed through the opening 16 and bent upwardly adjacent the lip 15. By now inserting two or three of the fingers of the hand through the openings 16 and 18 with one of said fingers or the thumb pressing against the tongue 17' to hold the converging walls 23 in engagement with each other, a milk bottle may be conveniently carried from place to place without danger of breaking the bottle or spilling the contents thereof. By folding the converging walls 23 downwardly and the side flaps 19 laterally and then exerting an upward pull on the portion 6, the carrier may be readily removed from the bottle neck, as will be readily understood.

Figure 5:
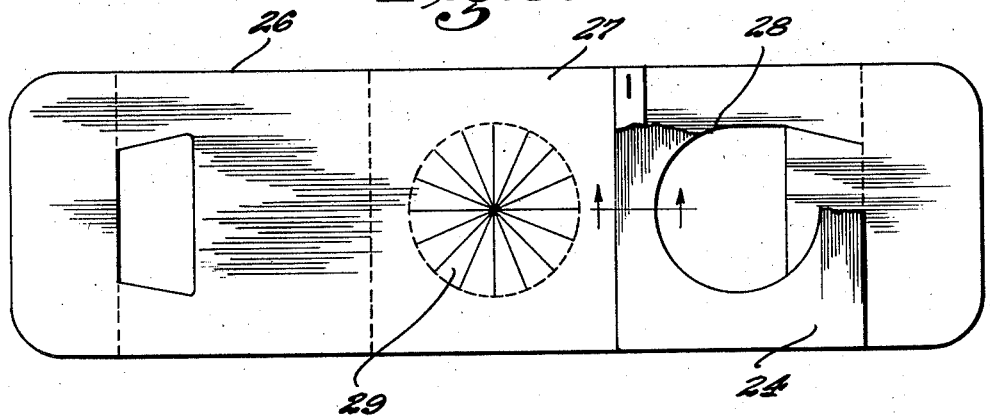
Figure 5 is a plan view of the blank of the carrier shown in Figure 4.
Figure 6:
Figure 6 is a detail transverse sectional view taken in the line 6—6 of Figure 5.

In Figures 4 to 6 inclusive of the drawings, there is illustrated a modified form of the invention, in which the side flaps are dispensed with and in lieu thereof an auxiliary flap 24 is secured by staples or similar fastening devices 25 to the blank 26 adjacent the tongue carrying the central section 27 thereof. This auxiliary flap 24 is provided with a circular opening 28 which fits over the tongues 29 when the blank is folded so that the wall of the opening will exert a clamping or wedging action on the tongues in the manner previously described.

It will be noted that the auxiliary flap 24 shown in Figure 5 of the drawings as well as the overlapped side flaps 19 illustrated in Figure 3 serve to reinforce and strengthen the carrier and also to absorb any moisture which may accumulate on the bottle cap and thus prevent said moisture from saturating and weakening the main central supporting section of the carrier.

Inasmuch as the carriers are made of paper, they may, if desired, be discarded after use, thereby rendering the device highly sanitary in character. If desired, one or more walls of the carrier may be provided with suitable advertising matter indicating the name of the dairy or persons furnishing the milk or any other desired legend.

It will, of course, be understood that the carriers may be made in different sizes and shapes and constructed of any suitable material without departing from the spirit of the invention.

Having thus described the invention, what is claimed as new is:

1. A device of the class described comprising a carrying member having its intermediate portion provided with slits defining bendable tongues for engagement with the bead on the neck of a bottle and its opposite ends provided with interengaging walls, and a flap cooperating with said carrying member and provided with an opening through which the tongues extend for holding said tongues in gripping engagement with said bead.

2. A device of the class described comprising a carrying member having its intermediate portion provided with radial slits defining bendable tongues for engagement with the bead on the neck of a bottle and its opposite ends provided with interengaging walls forming carrying handles, and oppositely disposed overlapping flaps on said carrying member and provided with registering openings through which the tongues extend for holding said tongues in gripping engagement with said bead.

3. A device of the class described comprising a carrying member having its intermediate portion provided with a circular series of radial slits defining bendable tongues normally disposed in a horizontal plane for engagement with the bead on the neck of a milk bottle and its opposite ends provided with interengaging walls constituting carrying handles, and oppositely disposed overlapping side flaps having registering openings formed therein through which the tongues extend for holding said tongues in gripping engagement with said bead.

4. A device of the class described comprising a carrying member having its intermediate portion provided with a circular series of radial slits defining bendable tongues for engagement with the bead on the neck of a bottle, said carrier being provided with converging end walls constituting carrying handles, said converging walls being formed with finger-receiving openings and the material at one of said openings being bent laterally through the other opening to form a locking tab, and oppositely disposed overlapping flaps forming a part of the carrier and provided with openings through which the tongues extend for holding said tongues in gripping engagement with the bead on said bottle.

5. A device of the class described comprising a carrying member having its intermediate portion provided with a substantially circular series of radial slits defining bendable tongues for engagement with the bead on the neck of a bottle, said carrier being provided with converging end walls constituting carrying handles and terminating in upstanding lips, the converging walls being provided with finger-receiving openings and the material at one of the openings being bent laterally and extended through the other opening to form a locking tab adapted to bear against the adjacent lip, and oppositely disposed overlapping flaps provided with registering openings through which the tongues extend for holding said tongues in gripping engagement with the bead on said bottle.

6. A bottle carrier formed from a blank having transverse fold lines defining a central portion and oppositely disposed end portions, the central portion being provided with a substantially circular series of radial slits defining bendable tongues, and side flaps forming a part of the blank and adapted to be folded inwardly over said tongues, said side flaps being provided with registering openings.

7. A bottle carrier formed from a single blank having transverse fold lines defining a central portion and oppositely disposed end portions, the central portion having a series of radiating slits formed therein defining bendable tongues, the end portions being formed with finger-receiving openings, there being transverse fold lines disposed at said finger-receiving openings and defining terminal lips, the material at one of said openings being bent laterally to form a locking tab adapted to extend through the other opening, and side flaps integral with the blank and adapted to be folded inwardly in overlapped relation over the tongues, said side flaps being provided with registering openings.

WENONA HICKMAN.
LAURA COSSEY.